(12) United States Patent
Sawdon et al.

(10) Patent No.: US 6,412,845 B1
(45) Date of Patent: Jul. 2, 2002

(54) SEALED GRIPPER

(75) Inventors: Edwin G. Sawdon, St. Clair; Andrew T. Sanders, Fort Gratiot, both of MI (US)

(73) Assignee: BTM Corporation, Marysville, MI (US)

( * ) Notice: Subject to any disclaimer, the term of this patent is extended or adjusted under 35 U.S.C. 154(b) by 12 days.

(21) Appl. No.: 09/611,924

(22) Filed: Jul. 7, 2000

(51) Int. Cl.⁷ .............................. B25B 1/00; B66C 1/00
(52) U.S. Cl. ........................................ 294/88
(58) Field of Search .................... 294/88, 1.1, 50.6, 294/86.4

(56) References Cited

U.S. PATENT DOCUMENTS

| | | |
|---|---|---|
| 1,667,616 A | 4/1928 | Wright et al. |
| 1,736,171 A | 11/1929 | Powell |
| 2,381,999 A | 8/1945 | Bonnafe |
| 2,845,847 A | 8/1958 | Blatt et al. |
| 3,027,155 A | 3/1962 | Paterson |
| 3,058,214 A | 10/1962 | Mekler |
| 3,273,878 A | 9/1966 | Blatt |
| 3,365,253 A | 1/1968 | Haller |
| 3,371,923 A | 3/1968 | Blatt |
| 3,469,892 A | 9/1969 | Langstroth |
| 3,545,050 A | 12/1970 | Blatt et al. |
| 3,565,415 A | 2/1971 | Blatt |
| 3,570,835 A | 3/1971 | McPherson |

(List continued on next page.)

FOREIGN PATENT DOCUMENTS

| | | |
|---|---|---|
| DE | 25 55 207 A1 | 7/1976 |
| EP | 0 317 924 | 11/1988 |
| EP | 0 341 155 | 5/1989 |
| EP | 0 508 881 | 4/1992 |
| GB | 1036830 | 7/1966 |
| GB | 2 082 945 | 3/1982 |

OTHER PUBLICATIONS

BTM Omni–Head Mini–Power Clamps, three pages, (prior to Mar. 13, 1992).
BTM Omni–Head 100 Series Mini–Power Clamps, one page, (prior to Mar. 13, 1992).
BTM Thin Power Clamps 2500–2000–390 Series, 1500–1000–140 Series, five pages, (prior to Mar. 13, 1992).
BTM Corporation Power Clamps 1500–1000–140 Series, three pages, (prior to Mar. 13, 1992).
BTM Corporation 1500 Series Power Grippers and Accessories, four pages, (prior to Mar. 13, 1992).
BTM "1500 Series Omni–Head Power Clamps", prior to Oct. 30, 1995, entire brochure.
BTM "Power Clamps & Grippers", prior to Oct. 30, 1995, entire brochure.
BTM "Grippers for High Speed Part Transfer in Press", prior to Oct. 30, 1995, entire brochure.
BTM "Sealed Power Clamps", prior to Oct. 30, 1995, entire brochure.
BTM Sealed Toggle Clamps, prior to Oct. 30, 1995, entire brochure.
BTM Corporation "Power Clamp 1500 Series", prior to Oct. 30, 1995, entire brochure.
BTM "Optional AC & DC Electrical Proximity Switches for BTM Power Clamps", prior to Oct. 30, 1995, 1 sheet (both sides).

*Primary Examiner*—Christopher J. Novosad
(74) *Attorney, Agent, or Firm*—Harness, Dickey & Pierce, P.L.C.

(57) ABSTRACT

A gripper includes a body and an actuator coupled to the body. The gripper further includes a first hub rotatably mounted to the body where the first hub is drivingly engaged with the actuator. A second hub is selectively drivingly engaged with the actuator. The second hub rotates in a direction opposite to the first hub. A first arm is coupled to the first hub and a second arm is coupled to the second hub. The first and second arms are articulable from open position to closed positions.

41 Claims, 7 Drawing Sheets

U.S. PATENT DOCUMENTS

| | | |
|---|---|---|
| 3,618,931 A | 11/1971 | Blatt |
| 3,702,185 A | 11/1972 | Blatt |
| 3,724,837 A | 4/1973 | McPherson |
| 4,019,784 A | 4/1977 | Ladin et al. |
| 4,021,027 A | 5/1977 | Blatt |
| 4,234,057 A | 11/1980 | Nakane et al. |
| 4,240,620 A | 12/1980 | Tünkers |
| 4,365,792 A | 12/1982 | Johns |
| 4,396,183 A | 8/1983 | Lymburner |
| 4,445,676 A | 5/1984 | Tünkers |
| 4,451,026 A | 5/1984 | Coope |
| 4,458,889 A | 7/1984 | McPherson et al. |
| 4,494,739 A | 1/1985 | Valentine |
| 4,496,138 A | 1/1985 | Blatt |
| 4,518,187 A | 5/1985 | Blatt et al. |
| 4,570,914 A | 2/1986 | Blatt |
| 4,591,138 A | 5/1986 | Baills et al. |
| 4,596,415 A | 6/1986 | Blatt |
| 4,618,131 A | 10/1986 | Campisi et al. |
| 4,620,696 A | 11/1986 | Blatt |
| 4,637,597 A | 1/1987 | McPherson et al. |
| 4,647,097 A | 3/1987 | Lessway |
| 4,647,100 A | 3/1987 | Lessway |
| 4,673,173 A | 6/1987 | Shochi et al. |
| 4,696,503 A | 9/1987 | Collodel |
| 4,707,013 A | 11/1987 | Vranish et al. |
| 4,723,767 A | 2/1988 | McPherson et al. |
| 4,723,806 A | 2/1988 | Yuda |
| 4,768,821 A | 9/1988 | Hucul et al. |
| 4,777,445 A | 10/1988 | Kahl |
| 4,793,602 A | 12/1988 | McPherson |
| 4,834,663 A | 5/1989 | Kahl |
| 4,836,091 A | 6/1989 | Taylor |
| 4,854,564 A | 8/1989 | McPherson et al. |
| 4,859,138 A | 8/1989 | Brocklebank et al. |
| 4,863,150 A | 9/1989 | Hödl et al. |
| 4,892,344 A | 1/1990 | Takada et al. |
| 4,905,973 A | 3/1990 | Blatt |
| 4,921,233 A | 5/1990 | Fabrice |
| 4,923,184 A | 5/1990 | Schauss |
| 5,072,652 A | 12/1991 | Blatt |
| 5,118,088 A | 6/1992 | Sawdon |
| 5,125,632 A | 6/1992 | Blatt et al. |
| 5,152,566 A | 10/1992 | Blatt et al. |
| 5,152,568 A | 10/1992 | Blatt |
| 5,163,729 A | 11/1992 | Borcea et al. |
| 5,165,670 A | 11/1992 | Sawdon |
| 5,171,001 A | 12/1992 | Sawdon |
| 5,174,709 A | 12/1992 | Blatt et al. |
| D334,701 S | 4/1993 | Blatt et al. |
| 5,222,854 A | 6/1993 | Blatt et al. |
| 5,277,411 A | 1/1994 | Justus |
| 5,299,847 A | 4/1994 | Blatt et al. |
| 5,374,042 A * | 12/1994 | Ring .......................... 270/52 |
| 5,452,981 A | 9/1995 | Crorey et al. |
| 5,490,663 A | 2/1996 | Stojkovic et al. |
| 5,516,173 A | 5/1996 | Sawdon |
| 5,853,211 A | 12/1998 | Sawdon et al. |
| 5,884,903 A | 3/1999 | Sawdon |
| 6,162,209 A * | 12/2000 | Gobron et al. .................. 606/1 |
| 6,175,973 B1 * | 1/2001 | Hakamiun et al. ............ 5/89.1 |
| 6,202,813 B1 * | 3/2001 | Yahata et al. .................. 192/64 |

* cited by examiner

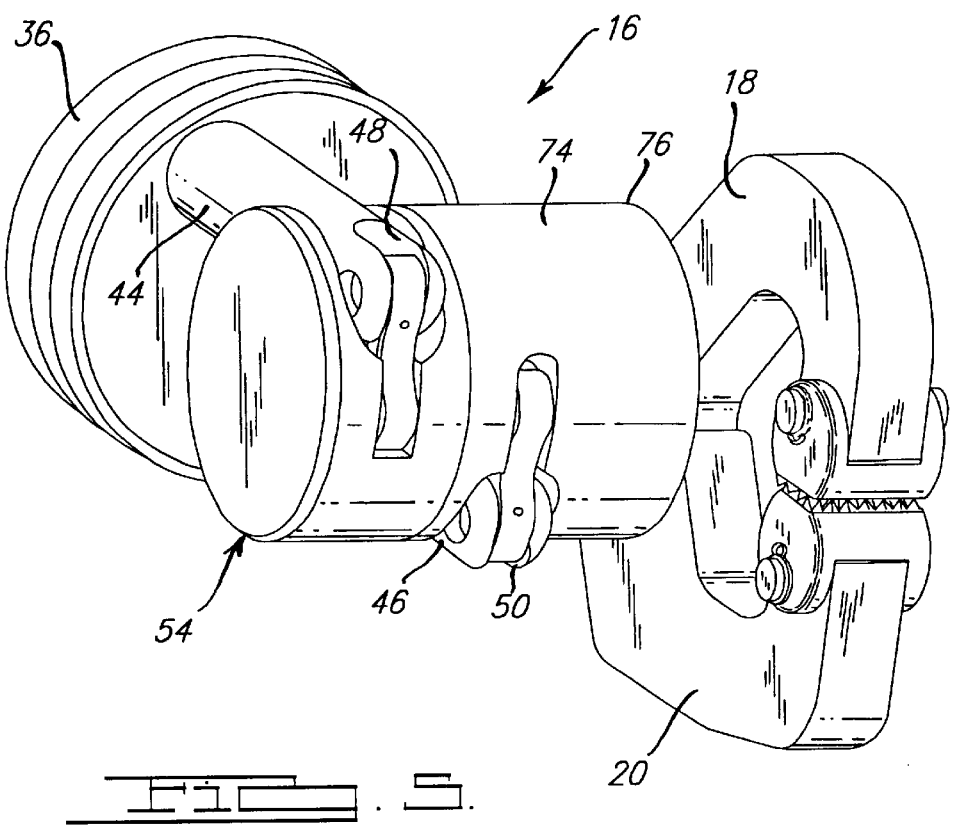
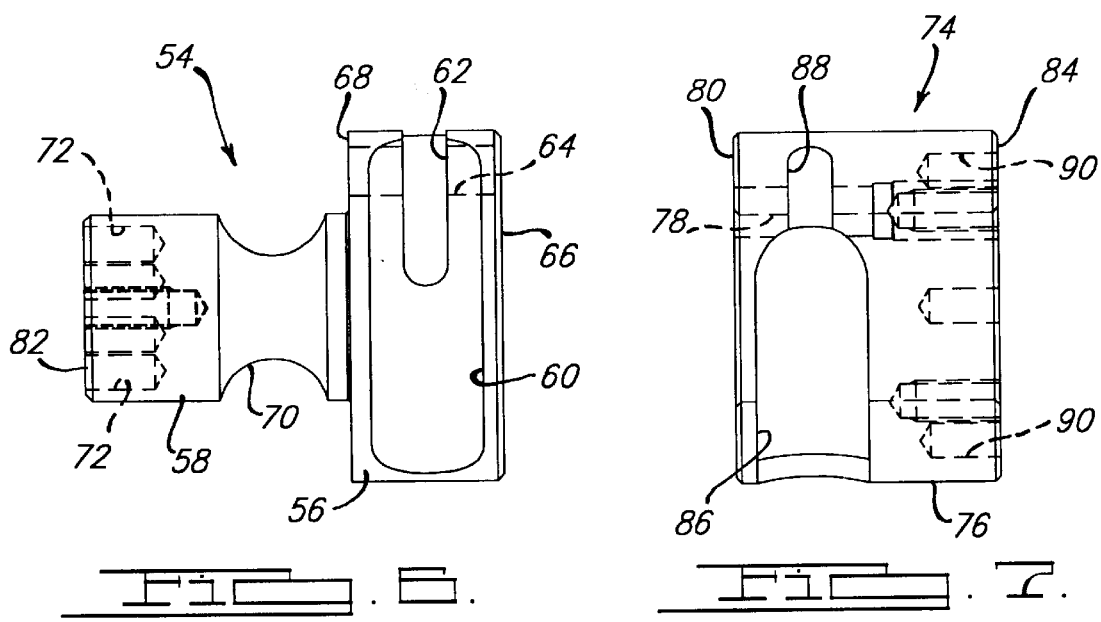

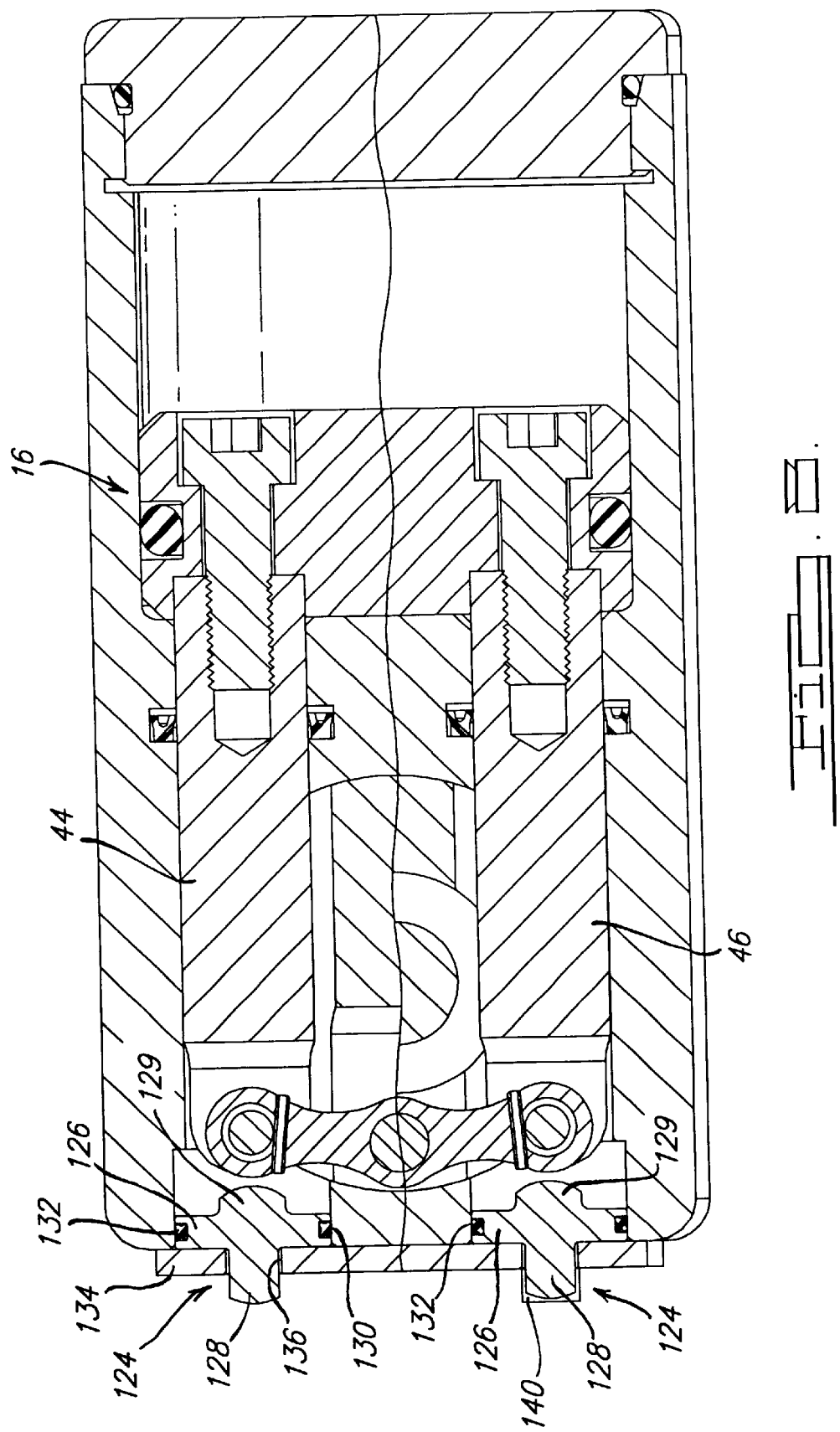

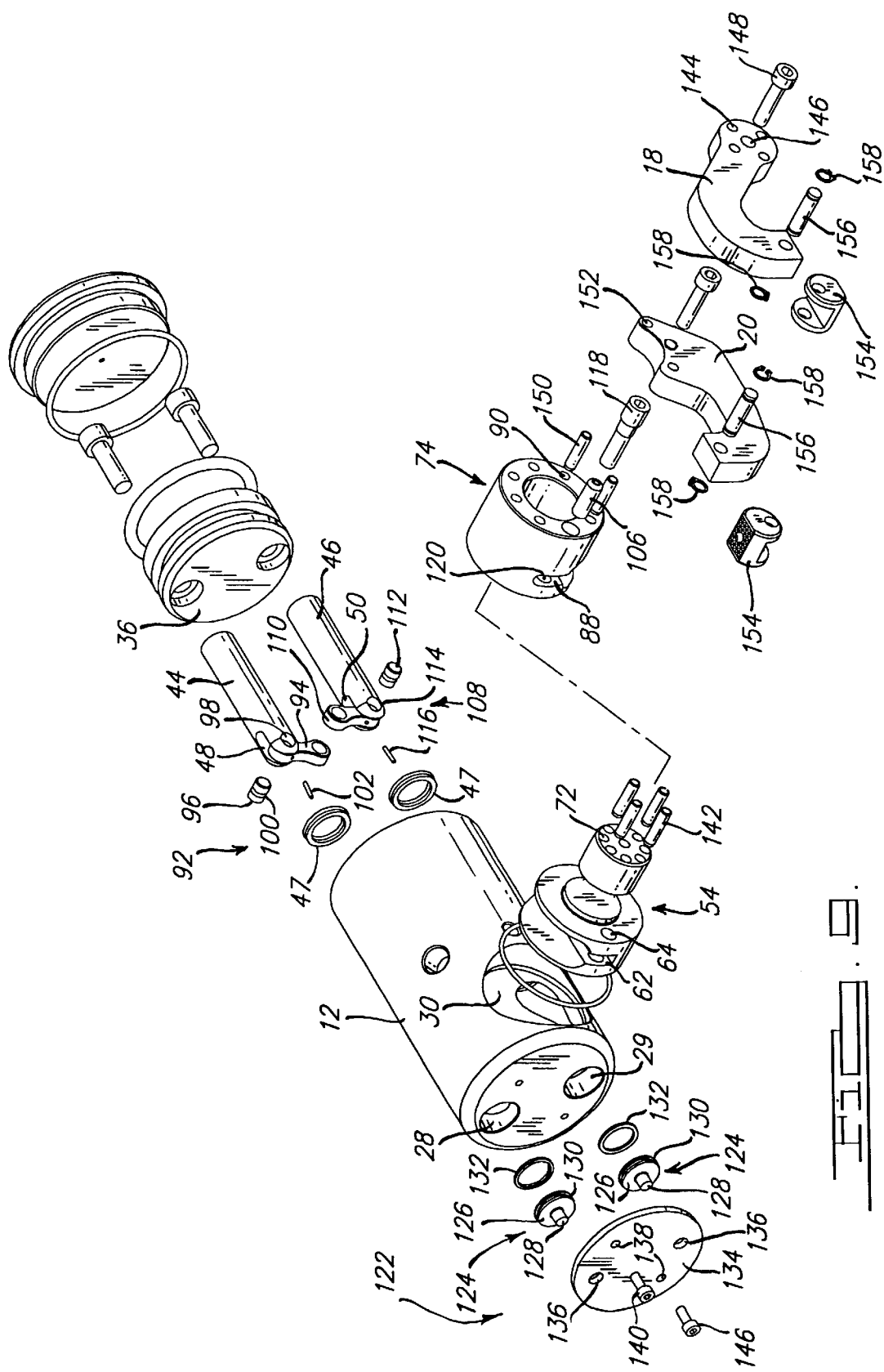

US 6,412,845 B1

SEALED GRIPPER

BACKGROUND AND SUMMARY OF THE INVENTION

The present invention relates to a gripper for grasping objects and, more particularly, to a sealed gripper for holding work pieces in adverse environments.

Grippers are commonly used in conjunction with robots in industrial applications for picking, placing and fixturing work pieces during the various steps of manufacturing a final component. Typical grippers include pneumatically or hydraulically actuated cylinders which cause one or more arms to move through a desired range of motion to grasp a work piece.

Unfortunately, when a mechanism such as a gripper is to be sealed to prevent ingress of contamination, one or more design features is often compromised. Specifically, a sealed mechanism is usually much larger than its unsealed counterpart due to the requirement of internal levers, cams and seals. Additionally, in the case of the gripper, it is difficult to seal counter-rotating hubs without increasing the size of the overall packaging envelope.

In accordance with the present invention, a gripper includes a body and an actuator coupled to the body. In another aspect of the present invention, the gripper further includes a first hub rotatably mounted to the body where the first hub is drivingly engaged with the actuator. A further aspect of the present invention provides a second hub axially aligned with the first hub and selectively drivingly engaged with the actuator. In yet another aspect of the present invention, the second hub rotates in a direction opposite to the first hub. In yet another aspect of the present invention, a first arm is coupled to the first hub and a second arm is coupled to the second hub. In yet another aspect of the present invention, the first and second arms are movable from an open position to a closed position in contact with each other. The present invention provides a balanced gripper having a mirrored opposite mount design. Additionally, piston force is distributed over two or more rods thereby reducing cocking and the possibility of jamming. The nested shaft, link and hub arrangement allows for compact packaging and reduced mechanical movement of components.

Additional benefits and advantages of the present invention will become apparent to those skilled in the art to which this invention relates and from the subsequent description of the preferred embodiments and the appended claims, taken in conjunction with the accompanying drawings.

BRIEF DESCRIPTION OF THE DRAWINGS

FIG. 3 is a fragmentary side view showing the preferred embodiment sealed gripper shown in FIG. 1;

FIG. 5 is a perspective view of an actuator mechanism employed with the preferred embodiment sealed gripper;

FIG. 6 is a side elevational view of an inner hub employed with the preferred embodiment sealed gripper;

FIG. 7 is a side elevational view of an outer hub employed with the preferred embodiment sealed gripper;

FIG. 8 is a cross-sectional view showing the preferred embodiment sealed gripper taken along line 7—7 of FIG. 1;

FIG. 9 is an exploded perspective showing the preferred embodiment sealed gripper;

DESCRIPTION OF THE PREFERRED EMBODIMENTS

Figure 1:
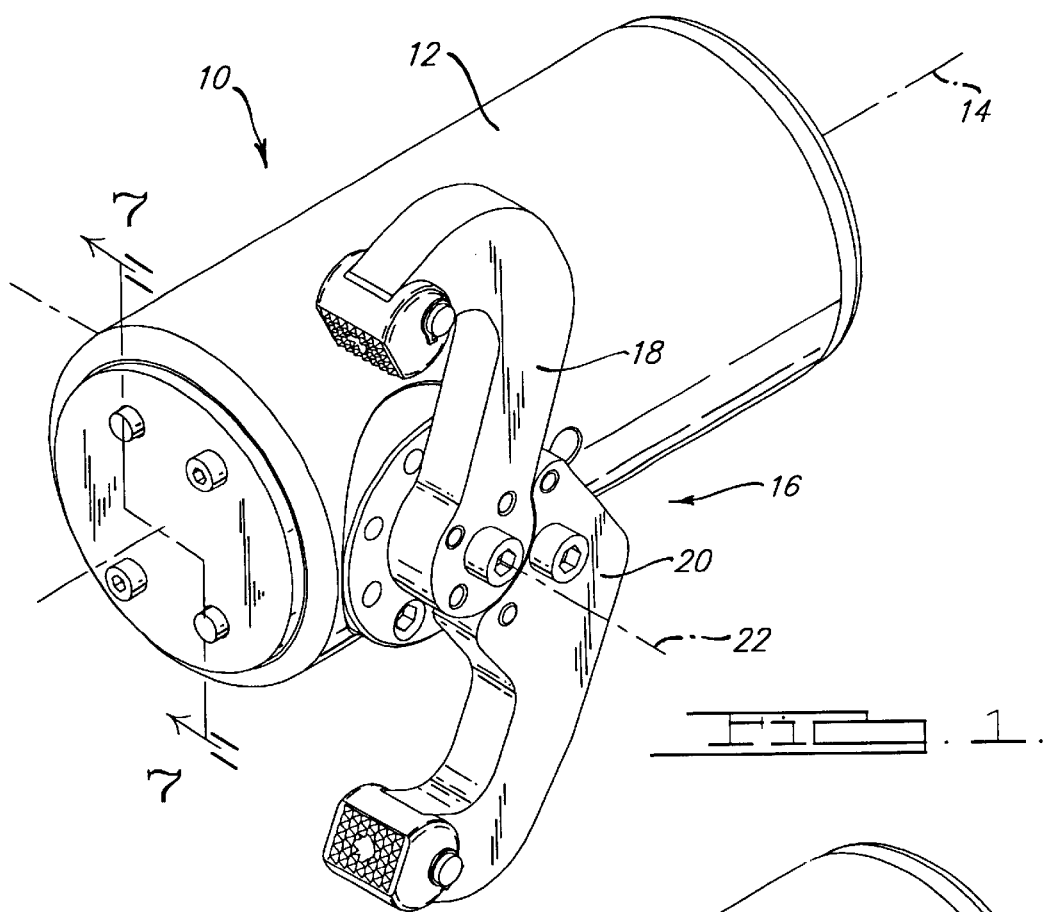
FIG. 1 is a perspective view of a sealed gripper showing the preferred embodiment of the gripper with gripper arms in a fully open position.
Figure 2:
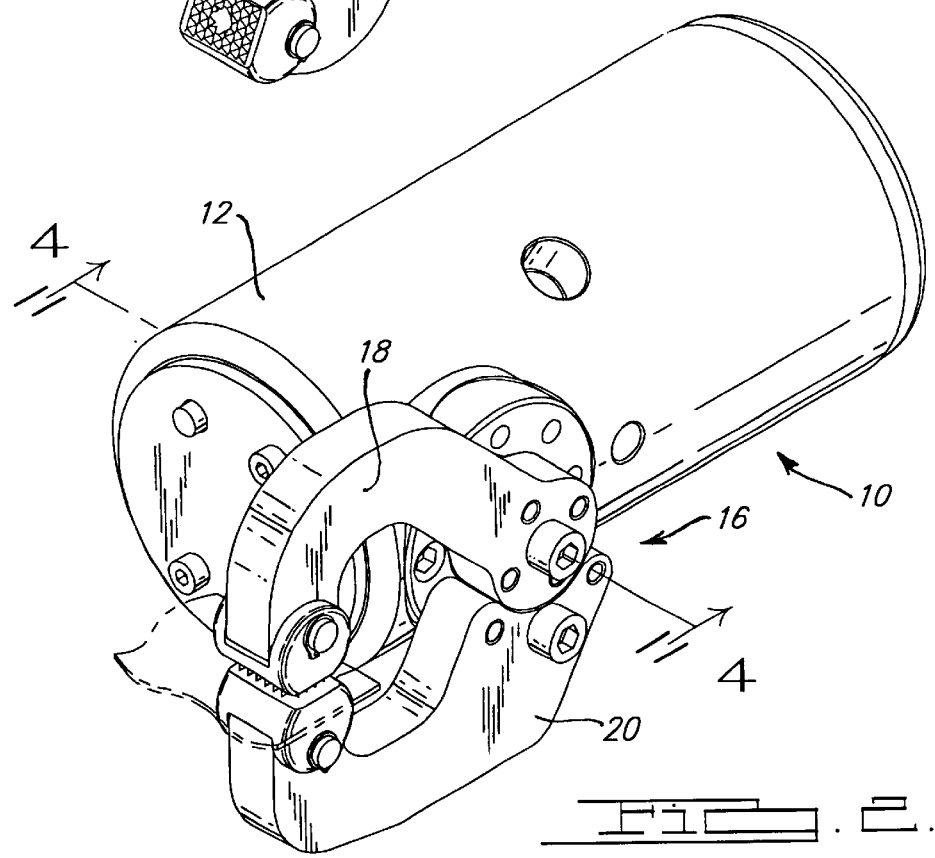
FIG. 2 is a perspective view showing the preferred embodiment sealed gripper with gripper arms in a fully clamped position.
Figure 2:
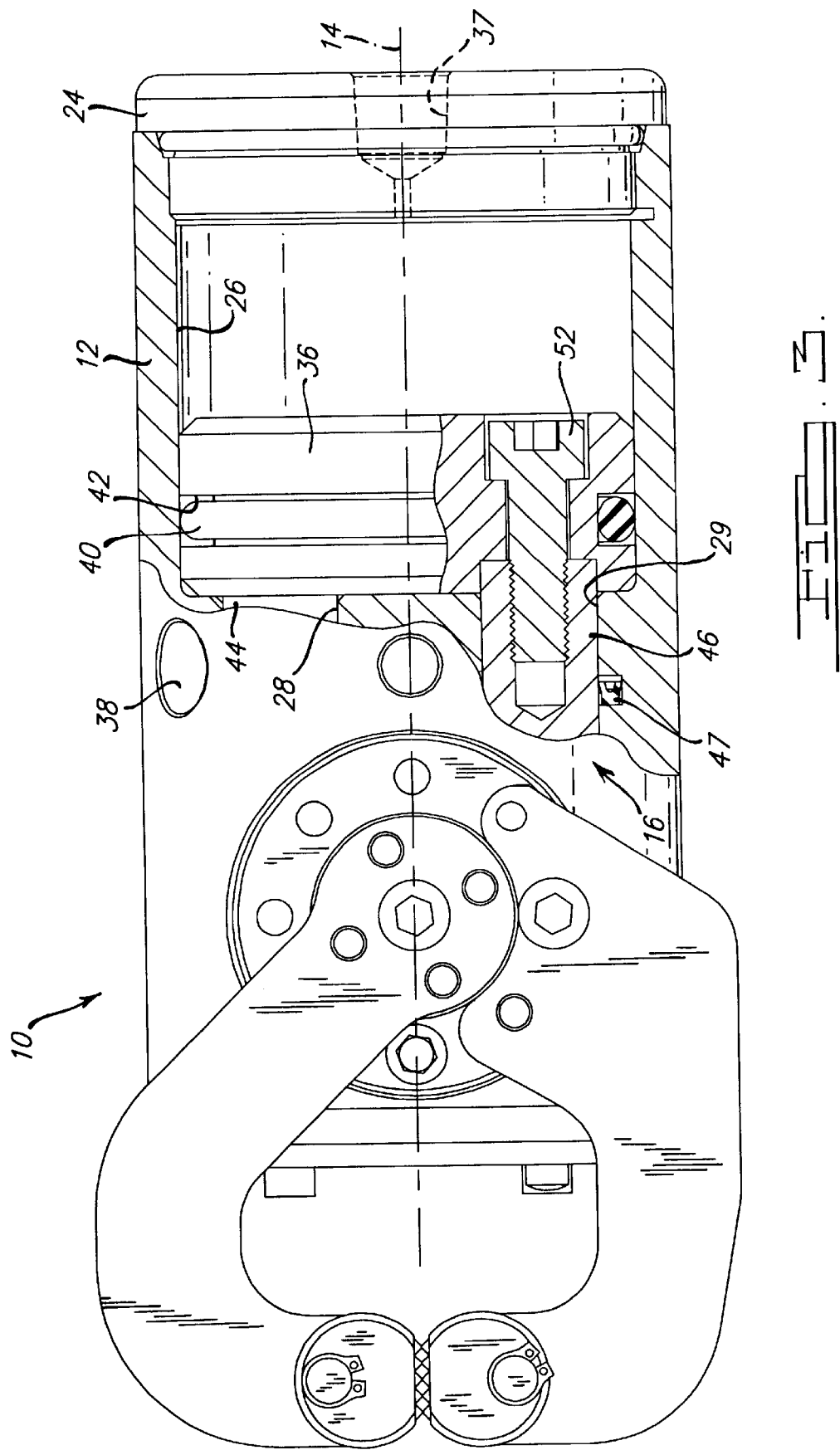

With reference to FIG. 1, a sealed gripper constructed in accordance with the teachings of a preferred embodiment of the present invention is generally identified at reference numeral 10. The sealed gripper 10 includes a body 12 defining a longitudinal axis 14 and an actuator mechanism 16 for rotating an inner arm 18 and an outer arm 20 about a transverse axis 22. The inner arm 18 and the outer arm 20 are positioned in FIG. 1 corresponding to a fully opened position. FIG. 2 depicts the sealed gripper 10 of the present invention having inner arm 18 and outer arm 20 rotated about transverse axis 22 to a fully clamped position.

Figure 4:
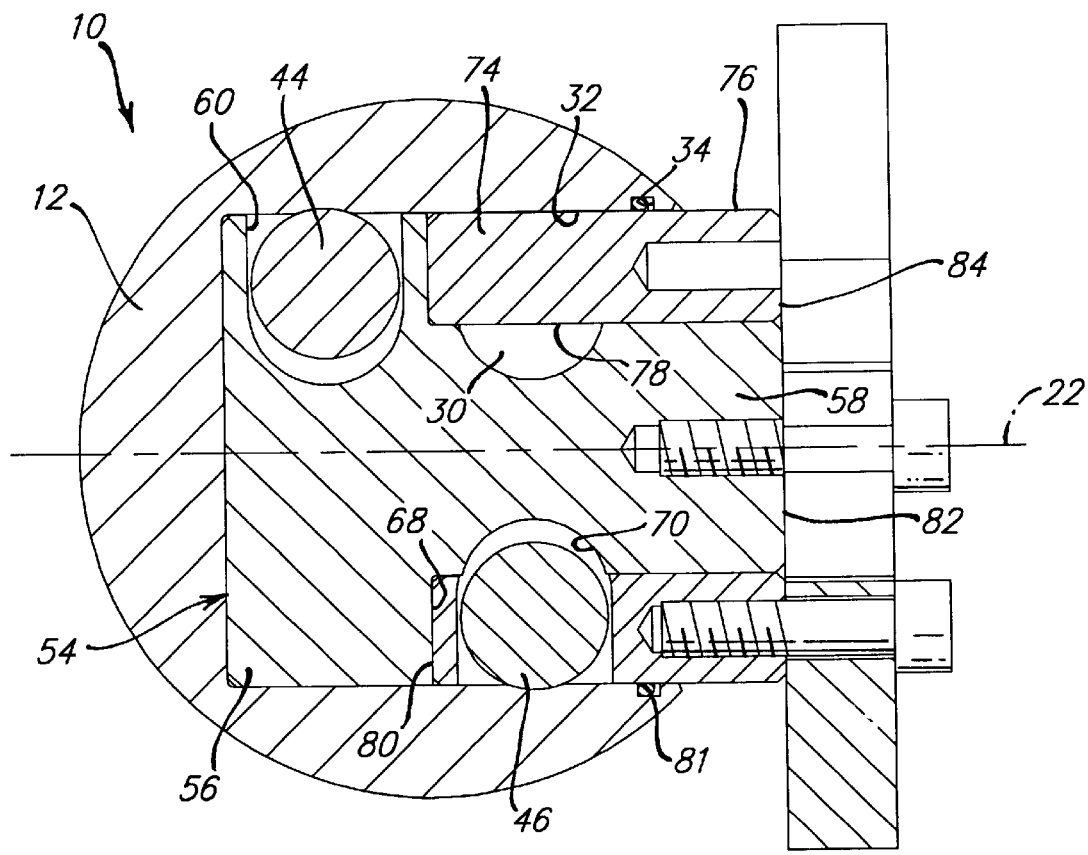
FIG. 4 is a cross-sectional view showing the preferred embodiment sealed gripper taken along line 4—4 of FIG. 2.

As shown in FIGS. 3 and 4, sealed gripper 10 further includes a removable end cap 24 defining a sealed cylinder chamber 26 aligned with longitudinal axis 14. End cap 24 is threadingly engaged to body 12. Additionally, an O-ring 27 provides a seal between end cap 24 and body 12.

Body 12 includes a pair of first and second cylindrical bores 28 and 29, respectively, extending parallel to and offset from longitudinal axis 14 interconnecting cylinder chamber 26 with an actuating chamber 30 (FIG. 9). Actuating chamber 30 includes a cylindrical wall portion 32 having an annular groove 34, each coaxially aligned with transverse axis 22.

Actuator mechanism 16 includes a piston 36 slidingly disposed within cylindrical chamber 26 for powered movement along longitudinal axis 14. Movement of piston 36 in an advancing or clamping direction is caused by a supply of pneumatic fluid under pressure entering cylinder chamber 26 via a port 37 positioned in end cap 24. Similarly, movement in an opposite or retracting direction is caused by supplying pressurized fluid through a port 38 positioned in body 12. A seal 40 is disposed within a circumferential groove 42 to restrict the pressurized fluid from passing between piston 36 and body 12.

Referring to FIGS. 4 and 5, actuator mechanism 16 includes a first piston rod 44 disposed and reciprocally slidable in bore 28. A second piston rod 46 is disposed and reciprocally slidable in bore 29. Each of the piston rods 44 and 46 has a bifurcated end defining slots 48 and 50, respectively. The opposite end of each of piston rods 44 and 46 is rigidly coupled to piston 36 via threaded fasteners 52. Accordingly, each of the piston rods axially translates corresponding to movement of piston 36. Each piston rod is sealingly engaged by a seal 47.

A first hub 54 includes a generally circular cylindrical first portion 56 integrally formed with and axially aligned to a drive shank or second portion 58. First hub 54 is disposed within actuating chamber 30 and generally supported by cylindrical wall 32 for rotational movement about transverse axis 22.

A generally hollow, circular cylindrically shaped second hub 74 has an outer surface 76 and a generally cylindrical aperture 78 coaxially extending therethrough. Second hub 74 is rotationally disposed in actuating chamber 30 such that an inner face 80 of second hub 74 abuts stop face 68 of first hub 54. A seal 81 is disposed in annular groove 34 in sealing engagement with outer surface 76 of second hub 74 to prevent ingress of contaminants. In addition, drive shank portion 58 of first hub 54 is disposed within aperture 78 of second hub 74. Drive shank portion 58 and second hub 74 are proportioned such that an outer face 82 of drive shank portion 58 becomes co-planar with an outer face 84 of second hub 74 at assembly.

Referring to FIG. 6, first portion 56 of first hub 54 includes a relatively wide centrally disposed first slot 60 in the peripheral surface thereof to provide clearance for first piston rod 44. First portion 56 also includes a relatively narrow second slot 62 centrally positioned in the bottom of first slot 60 and a transverse aperture 64 extending from a generally planar end face 66 to a stop face 68. Drive shank portion 58 includes a relief area 70 to provide clearance for second piston rod 46. Drive shank portion 58 also includes a plurality of blind transverse apertures 72 having center axes parallel to and at equal radii from transverse axis 22. In the preferred embodiment, transverse apertures 72 are spaced approximately 45° apart.

As shown in FIG. 7, second hub 74 includes a relatively wide first slot 86 disposed in the peripheral surface thereof to provide clearance for the second piston rod 46. Second hub 74 also includes a relatively narrow second slot 88 and a plurality of circumferentially disposed transverse blind apertures 90 which extend inwardly from outer face 84 of second hub 74. The center axes of the blind apertures 90 are positioned parallel to and at equal radii from transverse axis 22 and are preferably spaced 45° apart.

FIGS. 8 and 9 show first piston rod 44 of actuator mechanism 16 connected to first hub 54 via a first linkage assembly 92. Linkage assembly 92 includes a first link 94 having one end disposed in slot 48 of first piston rod 44. First link 94 is pivotally connected to the piston rod by a pin 96 disposed in a transverse aperture 98 extending through the bifurcated end of first piston rod 44. Pin 96 includes a circumferential groove 100 for receipt of a roll pin 102 disposed within a link aperture 104. Accordingly, axial displacement of pin 96 is limited to the amount of clearance between roll pin 102 and circumferential groove 100. The opposite end of first link 94 is disposed in second slot 62 and is pivotally connected to first hub 54 by a pin 106 disposed in transverse aperture 64 of first hub 54.

In similar fashion, a second linkage assembly 108 interconnects second piston rod 46 and second hub 74. The second linkage assembly 108 includes a second link 110 having a first end disposed in slot 50. Link 110 is pivotally interconnected to second piston rod 46 via a pin 112 disposed in a transverse aperture 114 extending through the bifurcated end of second piston rod 46. Pin 112 is retained via roll pin 116. The other end of second link 110 is disposed within second slot 88 of second hub 74. A threaded fastener 118 is axially disposed and threadingly engaged within an aperture 120 to pivotally interconnect link 110 to second hub 74.

An actuator release mechanism 122 includes a pair of plungers 124 disposed within first and second cylindrical bores 28 and 29, respectfully. Each of plungers 124 includes a disc shaped portion 126, a button portion 128 and a contact portion 129. Each of disc shaped portions 126 includes an annular groove 130 for receipt of an O-ring 132 sealingly engaged with body 12. Actuator release mechanism 122 further includes an end plate 134 having a first pair of apertures 136 for receipt of button portions 128 and a second pair of apertures 138 for receipt of fasteners 140. Accordingly, if actuator mechanism 16 binds during operation, an operator needs simply depress one or both of the button portions 128 to contact portion 129 to engage the piston rods thereby freeing the mechanism for later use.

As best seen in FIG. 9, a first set of shear pins 142 drivingly interconnect inner arm 18 and first hub 54. Specifically, shear pins 142 are partially disposed in the blind transverse apertures 72 and also partially disposed in a corresponding set of apertures 144 extending through inner arm 18. Inner arm 18 also includes an aperture 146 axially aligned with transverse axis 22 for receipt of a threaded fastener 148. Threaded fastener 148 extends through aperture 146 and is threadingly coupled to first hub 54. A second set of shear pins 150 are disposed within transverse blind apertures 90 and a corresponding pair of apertures 152 extending through outer arm 20 thereby drivingly interconnecting the outer arm with second hub 74.

A pair of gripper pads 154 are rotatably connected to arms 18 and 20 via pins 156. Each of pins 156 includes a pair of ring grooves for receipt of snap rings 158. It should be appreciated that the specific geometry of the arms and gripper pads shown is merely exemplary and that a wide variety of arm and gripper pad configurations may be used without departing from the scope of the present invention.

In the preferred embodiment and as mentioned earlier, axial displacement of piston 36 within cylinder chamber 26 causes both inner arm 18 and outer arm 20 to rotate about transverse axis 22. The arms are rotatable from a fully opened position shown in FIG. 1 to a fully clamped position shown in FIG. 2. It should be appreciated that alternate mounting positions of inner arm 18 and outer arm 20 relative to body 12 are easily established by simply removing threaded fasteners 118 and 148 and indexing the arms about transverse axis 22. Specifically, first set of shear pins 142 and second set of shear pins 150 may be repositioned and disposed within another set of blind apertures as desired. Accordingly, the fully clamped position need not be aligned with the longitudinal axis of the body as shown in FIG. 2 but may be indexed in 45° increments about transverse axis 22. Additionally, the housing and piston are preferably constructed from a high strength aluminum alloy. The hubs, arms and piston rods are preferably steel. It should be appreciated that other materials may be utilized without departing from the scope of the present invention.

Figure 10:
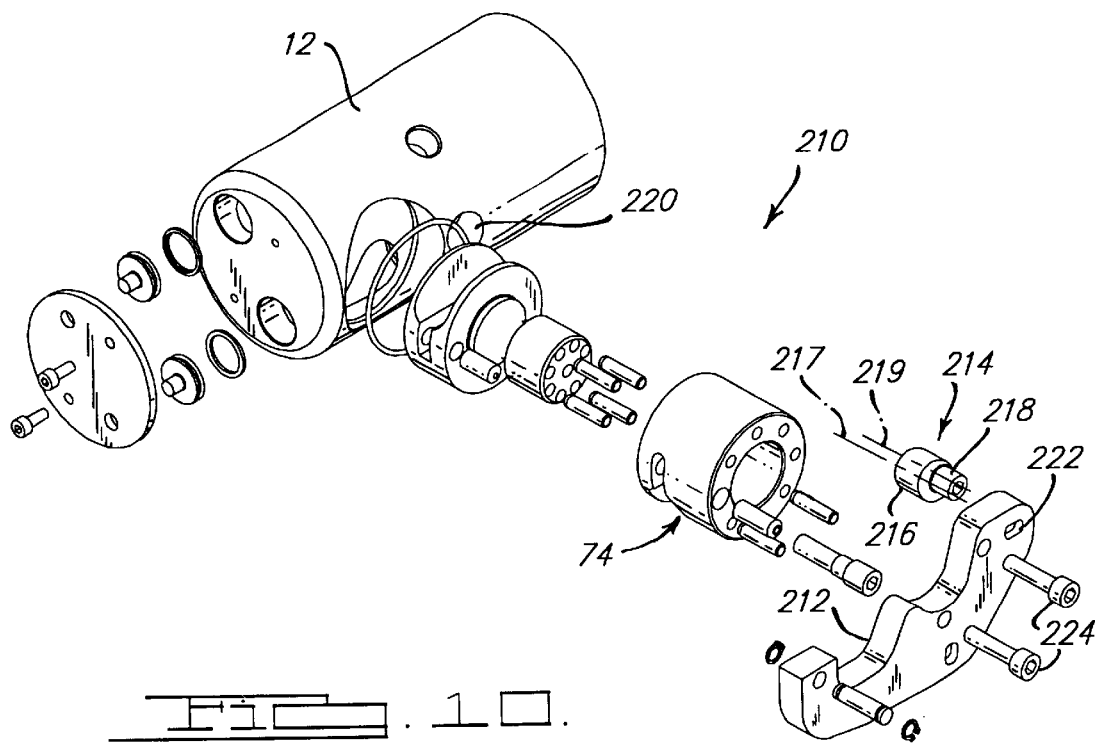
FIG. 10 is a partial exploded perspective view showing a second embodiment of the preferred sealed gripper.

Referring to FIG. 10, a second embodiment of the sealed gripper is depicted at reference numeral 210. It should be appreciated that second embodiment 210 functions in a substantially similar fashion to the first embodiment previously described. Accordingly, like elements will retain their original reference numerals.

The second embodiment of the sealed gripper 210 is directed to a mechanism having a fixed outer arm 212 acting in conjunction with moveable inner arm 18. Sealed gripper 210 includes an adjustment dowel 214 for adjustably coupling outer arm 212 to body 12 by providing an adjustment mechanism for positioning outer arm 212 relative to the fully clamped position of inner arm 18. In this manner, a user may compensate for the thickness of material being handled in a repeatable, simple manner.

Adjustment dowel 214 includes a cylindrical body 216 defining a longitudinal axis 217 and a generally cylindrical cam 218 integrally formed at one end of body 216. A longitudinal axis of the cam 219 is positioned in an offset relation to body longitudinal axis 217 thereby creating an eccentric adjustment mechanism. Body 216 of the adjustment dowel 214 is disposed within a complementary cylindrical aperture 220 formed within body 12 of sealed gripper 210. Outer arm 212 includes an elongated slot 222 for receipt of cam 218. Accordingly, rotation of the adjustment dowel 214 causes outer arm 212 to articulate about transverse axis 22. Outer arm 212 is coupled to second hub 74 via a pair of threaded fasteners 224.

Figure 11:
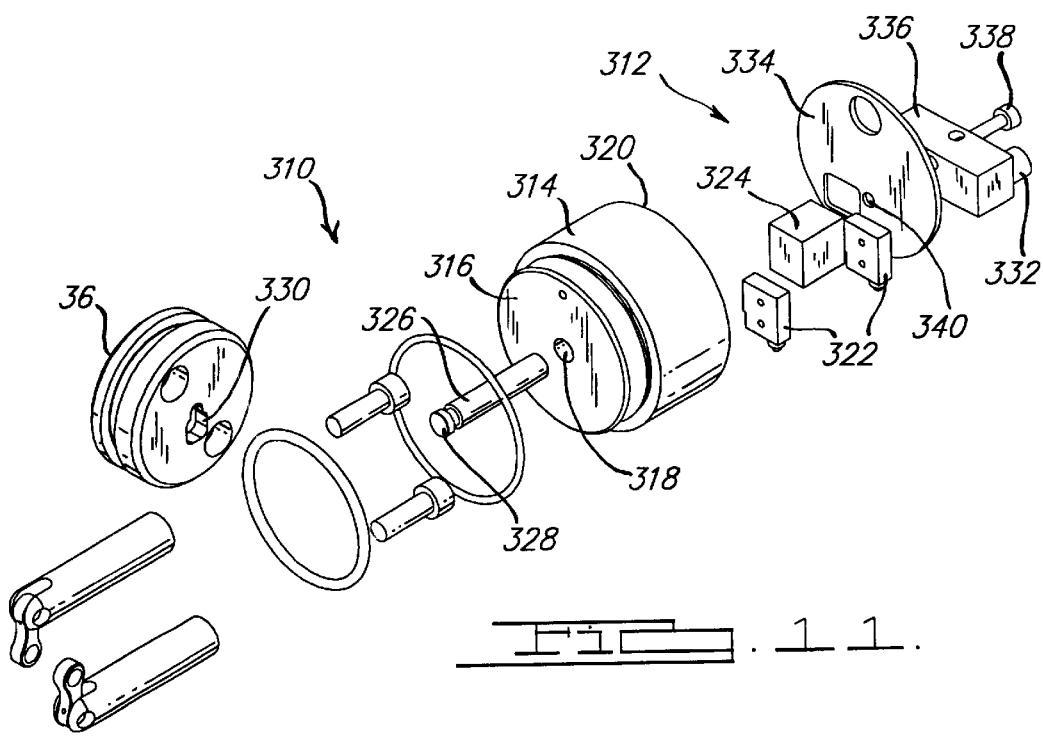
FIG. 11 is a partial exploded perspective view showing a third embodiment of the preferred sealed gripper.

A portion of a third embodiment of the sealed gripper is shown in FIG. 11 and generally identified by reference numeral 310. It should be appreciated that sealed gripper 310 functions substantially similarly to the prior two embodiments discussed and common components will be referenced with like numerals.

Sealed gripper 310 includes a position sensor 312 for signaling an operator when piston 36 is in the fully advanced or fully retracted position. Position sensor 312 includes a generally hollow cylindrical end cap 314 having an end wall 316 with an aperture 318 extending therethrough. End cap 314 defines a cavity 320 for housing the remaining position sensor components. Specifically, position sensor 312 further includes a pair of proximity switches 322 positioned within cavity 320 and spaced apart from one another a distance substantially equal to the total travel of piston 36. The proximity switch separation is maintained by inserting a spacer block 324 between each of switches 322. A plunger 326 is slidably disposed within aperture 318 and coupled to piston 36. Plunger 326 includes a knob 328 engaged with a key hole slot 330 formed in piston 36. As the piston 36 reaches either the fully extended or fully retracted position, the appropriate switch 322 is actuated by plunger 326. In turn, a light emitting diode 332 illuminates thereby indicating piston position. A cover plate 334 and a switch connector 336 complete the position sensor by enclosing cavity 320 and protecting position sensor 312 from contamination. Switch connector 332 is mounted to end cap 314 via a threaded fastener 338 disposed within an aperture 340 extending through cover plate 334. Switch connector 336 functions as a mount for diode 332 and also as an electrical terminal for wires (not shown) routed to proximity switches 322.

During operation of the preferred embodiment previously described, pneumatic pressure entering port 37 forces piston 36 in the clamping direction as discussed earlier. As piston 36 advances, force is transmitted through rods 44 and 46 and linkage assemblies 92 and 108 to first and second hubs 54 and 74, respectively. Because the piston rods 44 and 46 are located on opposite sides of transverse axis 22, first hub 54 rotates in a first direction and second hub 74 rotates in an opposite direction. Arms 18 and 20, being coupled to first and second hubs 54 and 74 move in an arcuate path until gripper pads 154 contact each other thereby producing a clamping force. Therefore, it should be appreciated that the configuration and operation of the sealed gripper provides manufacturing and operational advantages over the prior art. Specifically, the sealed gripper 10 of the present invention provides a balanced gripper suited for application in contaminated environments. Additionally, the nested shaft, link and hub arrangement allows for compact packaging and reduced mechanical movement of components.

The foregoing discussion discloses and describes merely exemplary embodiments of the present invention. Specifically, different arm shapes, additional linkages or camming links may be used for arms that have ends inside the body. In addition, the motive force could be hydraulic fluid or electrically driven. While various materials and angles have been disclosed, it should be appreciated that a variety of other materials and angles can be employed. It is intended by the following claims to cover these and any other departures from the disclosed embodiments which fall within the true spirit of this invention.

What is claimed is:

1. A gripper comprising:
    a body;
    an actuator coupled to said body;
    a first hub rotatably mounted to said body, said first hub being drivingly engaged with said actuator;
    a second hub axially aligned with said first hub, said second hub being selectively drivingly engaged with said actuator, said second hub operably rotating in a direction opposite to said first hub;
    a first arm coupled to said first hub; and
    a second arm coupled to said second hub, said first arm being movable from an open position to a closed position.

2. The gripper of claim 1 wherein said body has a chamber, said actuator includes a piston disposed in said chamber of said body, and said piston is lineally translated upon operation of said actuator.

3. The gripper of claim 2 further comprising a position sensor emitting an output indicative of a position of said piston.

4. The gripper of claim 3 wherein said output is a first signal when said piston is positioned at a fully extended position and a second signal when said piston is positioned at a fully retracted position.

5. The gripper of claim 2 wherein said actuator includes a first piston rod having a first end pivotally interconnected to said first hub and a second end coupled to said piston.

6. The gripper of claim 1 wherein said second hub is selectively disconnected from said actuator and further including an adjustment pin rigidly coupling said second hub to said body, thereby fixing a position of said second arm in relation to said body.

7. The gripper of claim 6 wherein said portion of said second arm may be adjusted by rotating said adjustment pin.

8. The gripper of claim 1 wherein said second hub includes an aperture for receiving at least a portion of said first hub.

9. The gripper of claim 1 wherein said body has a longitudinal axis and includes an aperture having a transverse axis, and said actuator acts along said longitudinal axis to rotate said first hub and said second hub about said transverse axis.

10. A gripper comprising:
    a body having first and second apertures;
    an actuator located in said first aperture;
    a first hub located in said second aperture, said first hub drivingly engaged with said actuator;
    a second hub located in said second aperture adjacent said first hub, said second hub encompassing at least a portion of said first hub;
    a first arm coupled to said first hub; and
    a second arm coupled to said second hub.

11. The gripper of claim 10 wherein said actuator operably rotates said first and second hubs in opposite directions.

12. The gripper of claim 11 wherein said actuator lineally translates in said first aperture.

13. The gripper of claim 10 wherein said first aperture defines a longitudinal axis and said second aperture defines a transverse axis orthogonally intersecting said longitudinal axis.

14. The gripper of claim 10 wherein said actuator includes a first piston rod having a first end and a second end, said first end being disposed in said first aperture and coupled to a piston, said second end being disposed in said second aperture and coupled to said first hub.

15. The gripper of claim 10 further comprising a seal engaging said second hub and said second aperture.

16. The gripper of claim 10 further comprising a cap coupled to said body and enclosing said first aperture.

17. The gripper of claim 10 wherein said actuator includes a piston pneumatically powered to drive said first and second hubs.

18. A gripper comprising:
a body;
a first hub rotatably mounted to said body;
a second hub positioned substantially coaxially to said first hub, said second hub being located at least partially in said body;
a first rod coupled to said first hub; and
a second rod selectively coupled to said second hub, said first rod being positioned substantially parallel to said second rod.

19. The gripper of claim 18 wherein displacement of said first and second rods in a first direction operably rotates said first and second hubs in opposite directions.

20. The gripper of claim 18 further comprising a piston located in said body, said first and second rods being coupled to said piston.

21. The gripper of claim 18 further comprising a first arm coupled to said first hub and a second arm coupled to said second hub.

22. A gripper comprising:
a body;
an arm coupled to said body;
an actuator coupled to said body, said actuator being operable to move said arm; and
an actuator release mechanism selectively operable to release said actuator if binding occurs.

23. The gripper of claim 22 wherein said body includes a bore and said actuator release mechanism includes a plunger partially disposed in said bore.

24. The gripper of claim 23 wherein said plunger is positioned proximate to said actuator, said plunger being operable to engage said actuator.

25. The gripper of claim 24 wherein said actuator includes a rotatable hub, a piston and a rod, said plunger operable to engage said rod and release said actuator.

26. The gripper of claim 25 wherein said plunger is coaxially positioned relative to said rod.

27. The gripper of claim 26 wherein said plunger includes a contact portion to engage said rod.

28. The gripper of claim 23 wherein said plunger includes a disc shaped portion sealingly engaged with said bore and a button portion protruding externally from said body.

29. The gripper of claim 28 wherein said contact portion and said button portion define a first axis and said disc shaped portion forms a second axis orthogonal to said first axis.

30. The gripper of claim 28 wherein said actuator release mechanism includes a cover having an aperture for receipt of said button.

31. A gripper comprising:
a body;
a first hub rotatably located in said body, said first hub having an integral drive shank; and
a second hub rotatably located in said body, said second hub having an aperture extending therethrough, said drive shank positioned in said aperture.

32. The gripper of claim 31 further comprising first and second piston rods, said first hub including a first slot for receipt of said first rod, said second hub including a first slot for receipt of said second rod.

33. The gripper of claim 32 wherein said first hub includes a second slot extending from said first slot and said second hub includes a second slot extending from said first slot.

34. A gripper comprising:
a body;
an actuator movably supported by said body;
a first hub rotatably supported by said body;
a second hub rotatably supported by said body;
a pair of links connecting said actuator to both of said hubs so that movement of said actuator in one direction causes said hubs to rotate in opposite directions, and movement of said actuator in the opposite direction causes each of said hubs to rotate in a reverse direction; and
a work piece engaging arm affixed to each of said hubs.

35. The gripper of claim 34 further including a seal positioned between said second hub and said body.

36. The gripper of claim 35 wherein said first hub and said second hub rotate about a common axis of rotation.

37. A method of operating a gripper including a first hub, a second hub and a work piece engaging an arm affixed to one of the first and second hubs, the method comprising:
(a) rotating the first hub in a first direction;
(b) rotating the second hub in a direction opposite the first direction; moving a second gripper arm in response to rotation of the other of the hubs, and gripping a work piece between the arms.

38. The method of claim 37 further comprising rotating the second hub concentrically about the first hub.

39. The method of claim 37 further comprising simultaneously rotating the hubs.

40. The method of claim 37 further comprising applying fluid pressure to state the first hub.

41. The method of claim 37 further comprising maintaining a second gripper arm in a stationary orientation relative to a body even when the hubs rotate.

* * * * *

UNITED STATES PATENT AND TRADEMARK OFFICE
CERTIFICATE OF CORRECTION

PATENT NO. : 6,412,845 B1
DATED : July 2, 2002
INVENTOR(S) : Edwin G. Sawdon and Andrew T. Sanders It is certified that error appears in the above-identified patent and that said Letters Patent is hereby corrected as shown below:

Column 2,
Line 3, after "perspective" insert -- view --.

Column 8,
Line 51, "state" should be -- rotate --.

Signed and Sealed this

Twenty-fifth Day of February, 2003

JAMES E. ROGAN
*Director of the United States Patent and Trademark Office*